(12) United States Patent
Ihara

(10) Patent No.: US 9,058,641 B2
(45) Date of Patent: Jun. 16, 2015

(54) IMAGE PROCESSING DEVICE AND IMAGE PROCESSING METHOD

(71) Applicant: SONY CORPORATION, Tokyo (JP)

(72) Inventor: Toshinori Ihara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/090,226

(22) Filed: Nov. 26, 2013

(65) Prior Publication Data
US 2014/0198988 A1 Jul. 17, 2014

(30) Foreign Application Priority Data
Jan. 16, 2013 (JP) ................................. 2013-005343

(51) Int. Cl.
*G06K 9/48* (2006.01)
*G06T 7/00* (2006.01)
*H04N 5/14* (2006.01)

(52) U.S. Cl.
CPC ........................ *G06T 7/00* (2013.01)

(58) Field of Classification Search
CPC .............. G06K 9/00; G06T 1/00; G06T 9/00; G06T 7/00

USPC .......................... 382/162, 197, 235, 276, 307; 375/240.01, 240.16; 386/264
See application file for complete search history.

(56) References Cited

U.S. PATENT DOCUMENTS

| 6,516,031 | B1 * | 2/2003 | Ishihara et al. | 375/240.16 |
| 7,599,436 | B2 * | 10/2009 | Kobayakawa | 375/240.16 |
| 7,952,614 | B2 * | 5/2011 | Lee | 348/208.99 |

FOREIGN PATENT DOCUMENTS

| JP | 2006-101267 | 4/2006 |
| JP | 2009-278322 | 11/2009 |

* cited by examiner

*Primary Examiner* — Abolfazl Tabatabai
(74) *Attorney, Agent, or Firm* — Sherr & Jiang, PLLC

(57) ABSTRACT

An image processing device includes a control unit which controls a read out of a reference image which is referred to when performing motion compensation on an image, with a range based on a maximum value of a motion amount in a vertical direction of a motion vector of the image as a target; and a motion compensation processing unit which performs motion compensation on the image using the motion vector and the reference image which is read out according to the control by the control unit.

15 Claims, 14 Drawing Sheets

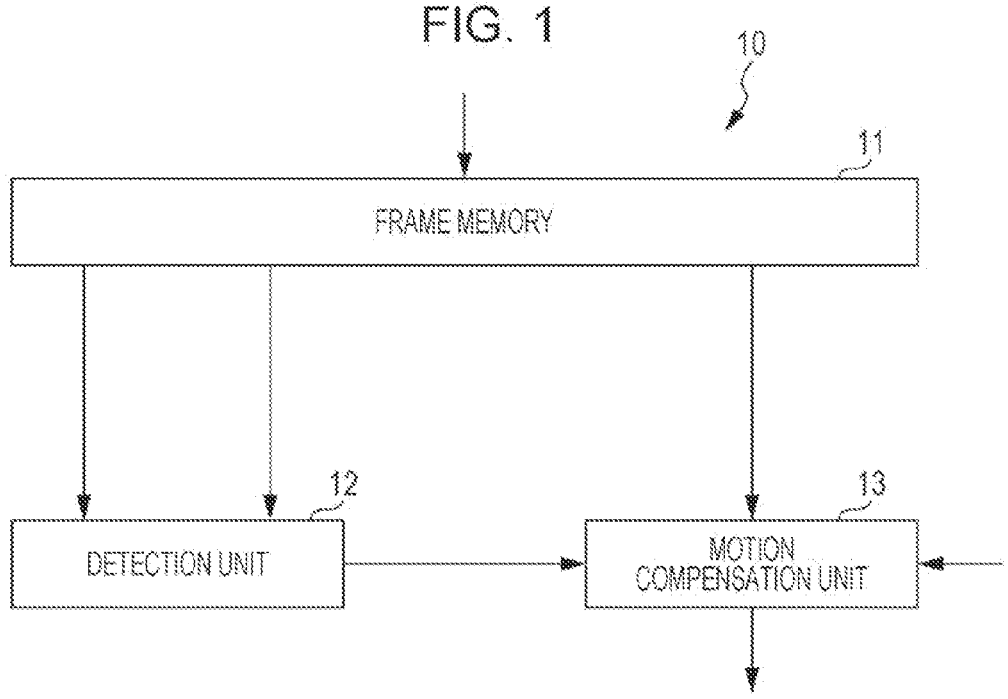
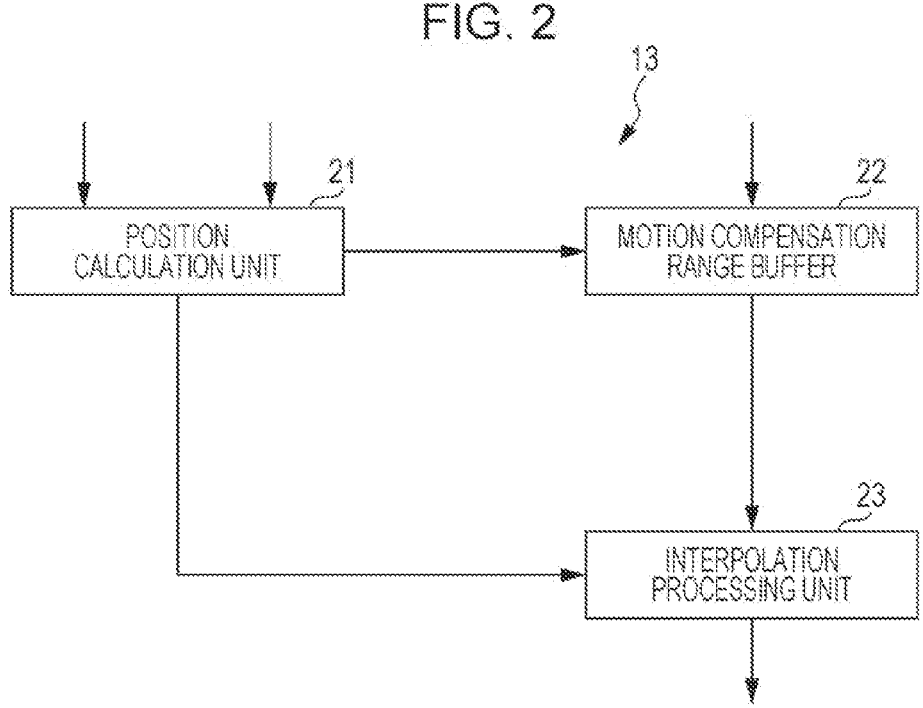

FIG. 13

| | VERTICAL MAXIMUM MOTION AMOUNT RANGE (-N TO +M) | MOTION AMOUNT IN VERTICAL DIRECTION OF PROCESSING-TARGET PIXEL | PROCESS | EFFECTS |
|---|---|---|---|---|
| READOUT TIMING OF ODD LINES AND EVEN LINES | LARGE | — | SHIFT | POSSIBLE TO EASILY GENERATE VERTICAL 1/2 SCALED DOWN IMAGE |
| | SMALL | — | DO NOT SHIFT | |
| CONFIGURATION OF CORRECTION RANGE BUFFER | LARGE | — | CONFIGURE USING AT LEAST ONE OF R0, R1, AND R2 | POSSIBLE TO SUPPRESS REGION OF VERTICAL 1/2 SCALED DOWN IMAGE |
| | SMALL | — | CONFIGURE USING ONLY R2 | |
| MOTION COMPENSATION PROCESS | LARGE | LARGE | INTERPOLATE USING R0, R1 (RESOLUTION REDUCTION) | REDUCTION OF RESOLUTION ONLY OCCURS WHEN VERTICAL MAXIMUM MOTION AMOUNT RANGE IS LARGE AND MOTION AMOUNT IN VERTICAL DIRECTION OF PROCESSING-TARGET PIXEL IS LARGE |
| | LARGE | SMALL | INTERPOLATE USING R2 | |
| | SMALL | LARGE | INTERPOLATE USING R2 | |
| | SMALL | SMALL | INTERPOLATE USING R2 | |

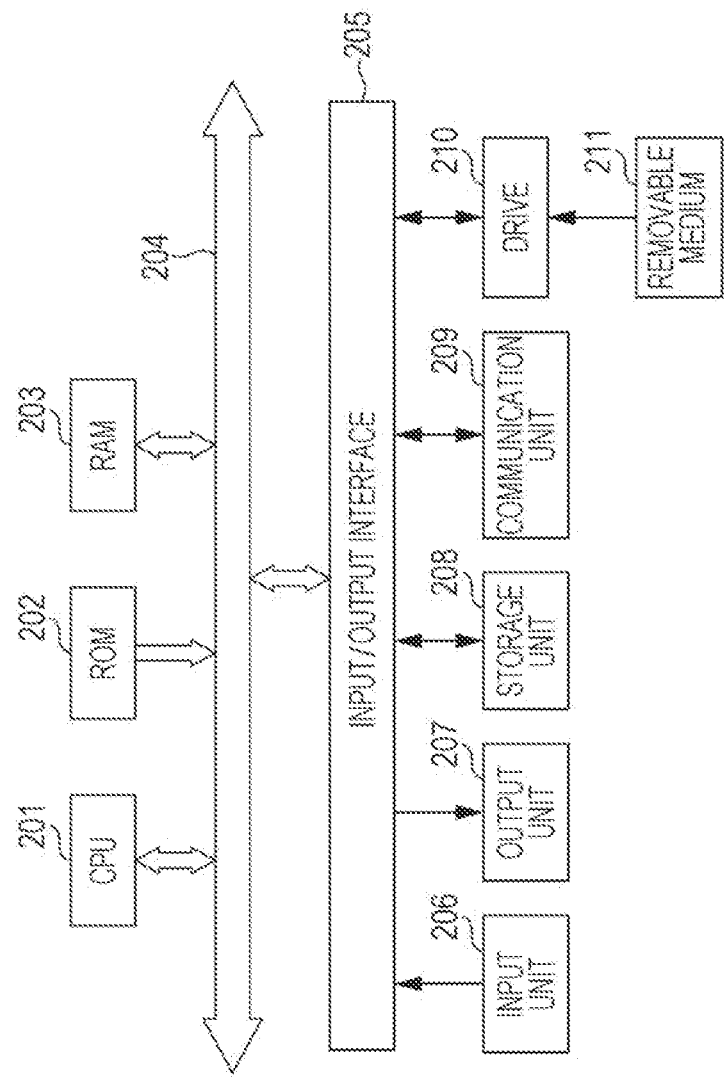

IMAGE PROCESSING DEVICE AND IMAGE PROCESSING METHOD

CROSS REFERENCE TO RELATED APPLICATIONS

This application claims the benefit of Japanese Priority Patent Application JP 2013-005343 filed Jan. 16, 2013, the entire contents of which are incorporated herein by reference.

BACKGROUND

The present disclosure relates to an image processing device and an image processing method. In particular, the present disclosure relates to an image processing device and an image processing method which enable a reduction in a data amount of a reference image which is referenced when performing motion compensation on an image, without degrading image quality of the image after motion compensation.

In relation to frame rate conversion performed using motion compensation, in motion vector detection processing and motion compensation processing, there is random access to images within a motion compensation range. However, there are many cases in which random access to the frame memory is not realizable due to the type of connection between the frame memory and a processing block and restrictions to the read-write data amounts.

In such cases, a buffer which maintains the image within the motion compensation range, which is read out from the frame memory, as the reference image is necessary in the processing block. The buffer capacity depends on the resolution of the reference image and the motion compensation range. Therefore, when the motion compensation range is expanded in order to realize support for fast motion, which is considered to be important as the basic performance of the frame rate conversion, the buffer capacity grows larger and the costs increase. Accordingly, there is a demand for a reduction in the buffer capacity.

In the motion vector detection process, the buffer capacity can be reduced by downscaling the reference image or compressing the dynamic range (the bit width) of the reference image. However, in the motion compensation processing, when the reference image is downscaled or the dynamic range of the reference image is compressed, the image quality of the image after motion compensation is degraded. Therefore, similarly to the case of the motion vector detection process, it is difficult to reduce the buffer capacity in the motion compensation processing.

Therefore, it is proposed that, using the characteristic that it is difficult to perceive a degradation of image quality in an image which has high speed motion, the reference images which correspond to high speed motion are downscaled, the reference images which correspond to static or slow motion are unchanged and motion compensation processing is performed thereon (for example, refer to Japanese Unexamined Patent Application Publication No. 2006-101267). According to the disclosure of Japanese Unexamined Patent Application Publication No. 2006-101267, the buffer capacity can be reduced while suppressing a degradation of the image quality of the image after motion compensation.

However, in the technology of Japanese Unexamined Patent Application Publication No. 2006-101267, there is a tradeoff between the buffer capacity and degradation of the image quality. In other words, when the downscale region of the reference image is increased, the buffer capacity decreases, however, since the motion amount corresponding to the downscale region increases, the motion amount range at which image quality degradation occurs increases. In contrast, when the downscale region of the reference image is reduced, the motion amount range at which image quality degradation occurs decreases, however, the buffer capacity increases.

In addition, it is proposed that the buffer capacity be reduced while suppressing the degradation of the image quality of the image after motion compensation by restoring the resolution using cubic convolution instead of the ordinary upscale process after performing the motion compensation processing using downscaled reference images (for example, refer to Japanese Unexamined Patent Application Publication No. 2009-278322). According to the disclosure of Japanese Unexamined Patent Application Publication No. 2009-278322, it is possible to suppress the degradation of the image quality of the image after motion compensation in comparison to a case in which the ordinary upscale process is performed, however, when compared to a case in which the reference images are not downscaled, there is degradation of the image quality.

SUMMARY

As described above, it is proposed that the buffer capacity be reduced while suppressing the degradation of the image quality of the image after motion compensation. However, it is not proposed that the buffer capacity, that is, the data amount of the reference image be reduced without degrading the image quality of the image after motion compensation.

The present disclosure was made in consideration of the above, and enables a reduction in the data amount of the reference image without degrading the image quality of the image after motion compensation.

According to an embodiment of the present disclosure, there is provided an image processing device which includes a control unit which controls a reading out of a reference image which is referred to when performing motion compensation on an image, with a range based on a maximum value of a motion amount in a vertical direction of a motion vector of the image as a target; and a motion compensation processing unit which performs motion compensation on the image using the motion vector and the reference image which is read out according to the control by the control unit.

An image processing method of an embodiment of the present disclosure corresponds to an image processing device of an embodiment of the present disclosure.

In the embodiment, the reading out of a reference image which is referred to when performing motion compensation on an image is controlled, with a range based on a maximum value of a motion amount in a vertical direction of a motion vector of the image as a target; and motion compensation is performed on the image using the motion vector and the reference image which is read out according to the controlling.

In the embodiment, it is possible to reduce the data amount of the reference image without degrading the image quality of the image after motion compensation.

BRIEF DESCRIPTION OF THE DRAWINGS

FIG. 1 is a block diagram showing an example of the configuration of an image processing device which performs frame rate conversion;

FIG. 2 is a block diagram showing an example of the configuration of a motion compensation unit of FIG. 1;

FIG. 13 is a diagram illustrating the effects of the image conversion unit;

FIG. 15 is a block diagram showing a configuration example of hardware of a computer.

DETAILED DESCRIPTION OF EMBODIMENTS

Figure 3:
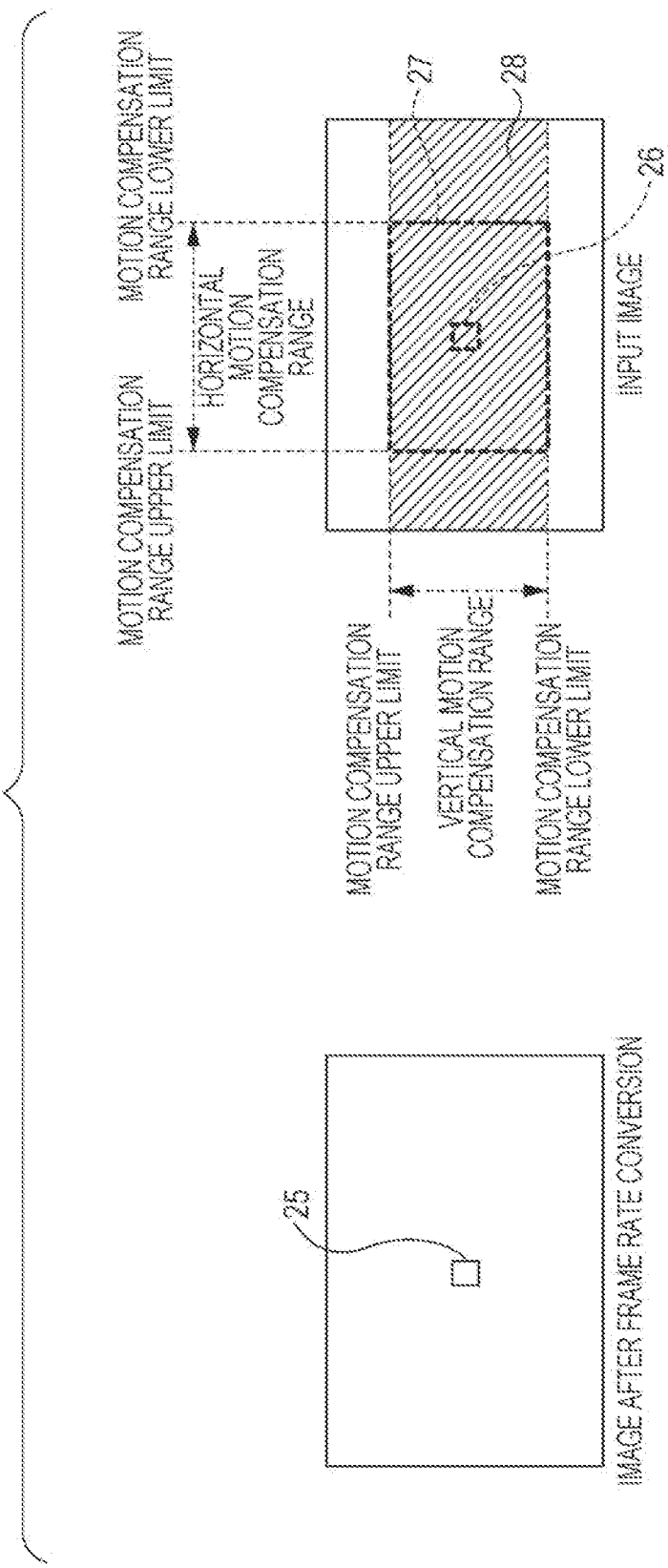
FIG. 3 is a view showing an example of a reference image.

Premises of Present Disclosure
Configuration Example of Image Processing Device

FIG. 1 is a block diagram showing an example of the configuration of the image processing device which performs frame rate conversion.

An image processing device 10 of FIG. 1 is configured to include frame memory 11, a detection unit 12 and a motion compensation unit 13. The image processing device 10 performs frame rate conversion using motion compensation in relation to images which are input from outside.

Specifically, the frame memory 11 of the image processing device 10 is configured from DDR (Double Data Rate) memory or the like, and stores an input image which is a frame-unit image input from the outside.

The detection unit 12 reads out luminance signals of processing-target pixels of a basis frame, which is a processing-target frame, from the frame memory 11 in horizontal line units in raster scan order (sequential scanning) and maintains the luminance signals in a buffer built into the detection unit 12. In addition, the detection unit 12 reads out the luminance signals of a search range of a motion vector of the processing-target pixels within the input image of the reference frame, which is the frame before or after the basis frame, from the frame memory 11 in horizontal line units in raster scan order and maintains the luminance signals in a buffer built into the detection unit 12. The detection unit 12 performs block matching or the like using the luminance signals of the basis frame and the reference frame which are maintained, and detects the motion vector for each pixel. The detection unit 12 supplies the detected motion vectors to the motion compensation unit 13.

The motion compensation unit 13 uses each pixel of the image generated after frame rate conversion as the processing-target pixel, in raster scan order. The motion compensation unit 13 reads out the luminance signals and color difference signals of the motion compensation range of the processing-target pixel within the input image of the basis frame from the frame memory 11 in horizontal line units in raster scan order and maintains the signals as a reference image in the buffer built into the frame memory 11.

Furthermore, the motion compensation range is determined on the basis of the motion vector range which corresponds to the search range, and the interpolation phase which is the phase of the image after frame rate conversion which is input from outside. In addition, the motion compensation range is the range of the input image which corresponds to the motion vector range in relation to the image after frame rate conversion.

Specifically, when the motion vector range which corresponds to the motion compensation range is from −L to +L, the motion vector range which corresponds to the search range is from −X to +X, and the interpolation phase is Y, the relationship of Equation (1) below is satisfied.

$$L = X * Y \quad (1)$$

In addition, the interpolation phase is the time of the image after frame rate conversion when the time between frames of the input image is 1, and is a positive number from 0 to less than 1. For example, when the frame rate of the images after frame rate conversion is two times the frame rate of the input images, the interpolation phase is 0 or 0.5.

The motion compensation unit 13 obtains the motion vector of the processing-target pixel on the basis of the motion vector which is supplied from the detection unit 12 and the interpolation phase which is input from outside. The motion compensation unit 13 performs motion compensation for each processing-target pixel using the motion vector and the reference image maintained in the buffer built into the motion compensation unit 13, and generates the image after motion compensation as the image after frame rate conversion. Furthermore, the motion compensation unit 13 outputs the image after frame rate conversion.

Configuration Example of Motion Compensation Unit

FIG. 2 is a block diagram showing an example of the configuration of the motion compensation unit 13 of FIG. 1.

The motion compensation unit 13 of FIG. 2 is configured to include a position calculation unit 21, a motion compensation range buffer 22 and an interpolation processing unit 23.

The position calculation unit 21 of the motion compensation unit 13 determines each pixel of the image generated after frame rate conversion to be the processing-target pixel, in raster scan order. The position calculation unit 21 obtains the motion vector of the processing-target pixel on the basis of the motion vector which is supplied from the detection unit 12 of FIG. 1 and the interpolation phase which is input from outside.

The position calculation unit 21 calculates the position of the integer precision in pixel units and the decimal precision in pixel units of the input image which corresponds to the processing-target pixel on the basis of the motion vector of the processing-target pixel. The position calculation unit 21 supplies the calculated integer precision position in pixel units to the motion compensation range buffer 22 and supplies the decimal precision position in pixel units to the interpolation processing unit 23.

The motion compensation range buffer 22 reads out the luminance signals and the color difference signals of the motion compensation range of the processing-target pixels within the input image of the basis frame from the frame memory 11 in horizontal line units in raster scan order and maintains the signals as a reference image. The motion compensation range buffer 22 reads out the luminance signal and the color difference signal of a predetermined pixel within the reference image which is maintained on the basis of the integer precision position in pixel units from the position calculation unit 21, and supplies the signals to the interpolation processing unit 23.

The interpolation processing unit 23 performs linear interpolation or the like on the luminance signals and the color difference signals read out from the motion compensation range buffer 22 on the basis of the decimal precision position in pixel units supplied from the position calculation unit 21. In addition, the interpolation processing unit 23 generates the luminance signals and the color difference signals of the processing-target pixels. The interpolation processing unit 23 outputs the generated luminance signals and color difference signals of the processing-target pixels as the luminance signals and the color difference signals of the pixels of the image after frame rate conversion.

As described above, the position calculation unit 21, the motion compensation range buffer 22 and the interpolation processing unit 23 perform the motion compensation processing using the motion vectors of the processing-target pixels and the reference image, and generate the image after motion compensation processing as the image after frame rate conversion.

Example of Reference Image

FIG. 3 is a view showing an example of a reference image.

As shown in FIG. 3, each of the pixels of the image after frame rate conversion is sequentially treated as a processing-target pixel 25. The motion compensation range buffer 22 reads out the luminance signals and the color difference signals of a motion compensation range 27 of the pixel 25 including a pixel 26 of the input image which corresponds to the pixel 25 in horizontal line units and maintains the signals as a reference image. Therefore, the luminance signals and the color difference signals of a range 28 formed from all of the pixels of each horizontal line within a motion compensation range 27 are stored in the motion compensation range buffer 22 as the reference image.

Accordingly, the data amount of the luminance signals and the color difference signals of the range 28 is the capacity which is necessary as the storage capacity of the motion compensation range buffer 22. The data amount is determined by the motion compensation range in the vertical direction, the resolution of the reference image and the dynamic range. Accordingly, it is possible to reduce the storage capacity of the motion compensation range buffer 22 by reducing the resolution or dynamic range of the reference image. However, the image quality of the image after motion compensation is degraded by the reduction of the resolution or dynamic range of the reference image.

Other Configuration Example of Image Processing Device

Figure 4:
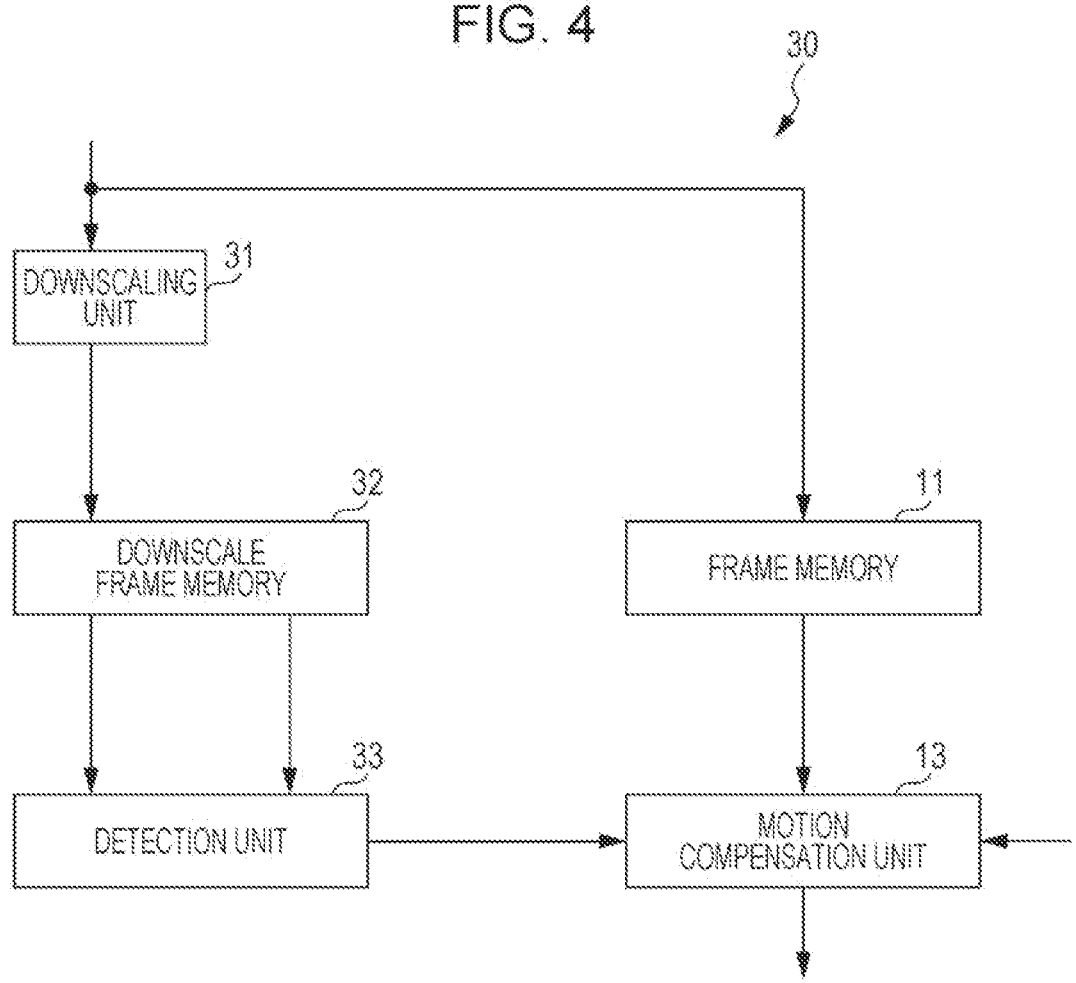
FIG. 4 is a block diagram showing another example of the configuration of the image processing device which performs frame rate conversion.

FIG. 4 is a block diagram showing another example of the configuration of the image processing device which performs frame rate conversion.

Of the components shown in FIG. 4, components which are the same as those in FIG. 1 are given the same reference numerals. Redundant description will be omitted as appropriate.

The configuration of an image processing device 30 of FIG. 4 differs from the configuration of the image processing device 10 of FIG. 1 in that a downscaling unit 31 and a downscale frame memory 32 are newly provided, and in that a detection unit 33 is provided instead of the detection unit 12. The image processing device 30 reduces the resolution of the input image and detects the motion vectors using the downscaled image obtained as a result of the reduction.

Specifically, the downscaling unit 31 of the image processing device 30 reduces the resolution of the input image and generates the downscaled image in frame units. The downscaling unit 31 supplies the downscaled image, which is generated in frame units, to the downscale frame memory 32. The downscale frame memory 32 stores the downscaled image in frame units supplied from the downscaling unit 31.

The detection unit 33 reads out the luminance signals of the processing-target pixels of the basis frame from the downscale frame memory 32 in horizontal line units in raster scan order and maintains the luminance signals in a buffer built into the detection unit 33. In addition, the detection unit 33 reads out the luminance signals of the search range of the processing-target pixel within the downscaled image of the reference frame from the downscale frame memory 32 in horizontal line units in raster scan order and maintains the luminance signals in a buffer built into the detection unit 33. The detection unit 33 performs block matching or the like using the luminance signals of the basis frame and the reference frame which are maintained, and detects the motion vector for each pixel. The detection unit 33 supplies the detected motion vectors to the motion compensation unit 13.

As described above, since the image processing device 30 detects the motion vectors using the downscaled image, in comparison with the image processing device 10, the data amount of the image used in the motion vector detection is reduced and it is possible to reduce the storage capacity of the buffer which is built into the detection unit 33.

Embodiment

Configuration Example of Embodiment of Image Processing Device

Figure 5:
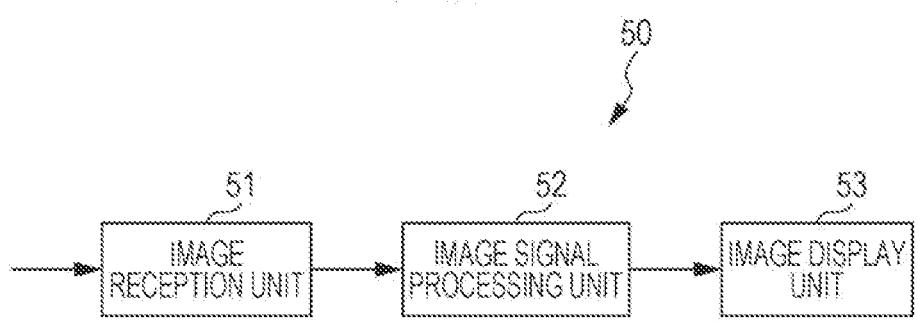
FIG. 5 is a block diagram showing a configuration example of an embodiment of an image processing device to which the present disclosure has been applied.

FIG. 5 is a block diagram showing the configuration example of an embodiment of the image processing device to which the present disclosure has been applied.

An image processing device 50 of FIG. 5 is configured to include an image reception unit 51, an image signal processing unit 52 and an image display unit 53. The image processing device 50 performs frame rate conversion using motion compensation in relation to a two dimensional image or a three dimensional image of N view points (where N is an integer of 2 or more) which are input from outside as the input images, and displays the image after frame rate conversion.

Specifically, the image reception unit 51 receives an analogue signal of the input image and generates a digital signal using analogue-digital conversion. The image reception unit 51 supplies the digital signal of the input image to the image signal processing unit 52.

The image signal processing unit 52 performs frame rate conversion using motion compensation in relation to the digital signal of the input image supplied from the image reception unit 51. The image signal processing unit 52 controls the image display unit 53 and causes the image display unit 53 to display the image after frame rate conversion.

The image display unit 53 is configured from a display device such as an LCD (a Liquid Crystal Display) or an OLED (an Organic Light-Emitting Diode). According to the control of the image signal processing unit 52, the image display unit 53 displays the image after frame rate conversion which is supplied from the image signal processing unit 52.

Configuration Example of Image Signal Processing Unit

Figure 6:
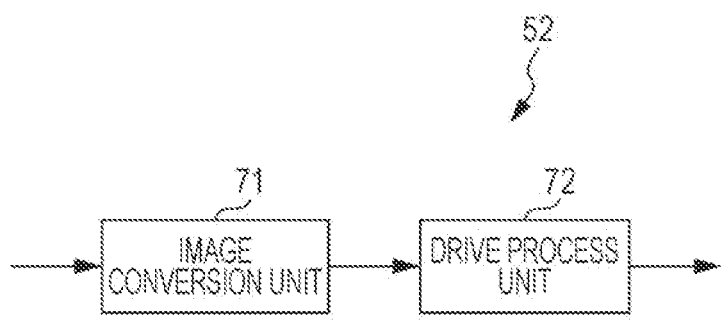
FIG. 6 is a block diagram showing a configuration example of an image signal processing unit of FIG. 5.

FIG. 6 is a block diagram showing a configuration example of the image signal processing unit 52 of FIG. 5.

The image signal processing unit 52 of FIG. 6 is configured to include an image conversion unit 71 and a drive process unit 72.

The image conversion unit 71 of the image signal processing unit 52 performs frame rate conversion using motion compensation in relation to the digital signal of the input image supplied from the image reception unit 51 of FIG. 5, and supplies the image after the frame rate conversion to the drive process unit 72.

Furthermore, in the present embodiment, the image conversion unit 71 only performs the frame rate conversion. However, it is also possible to configure the image conversion unit 71 to perform image processing other than the frame rate conversion. For example, when the digital signal of the input image is compressed, it is also possible to configure the image conversion unit 71 to perform decompression processing in relation to the digital signal of the input image. In addition, it is also possible to configure the image conversion unit 71 to perform processes such as conversion to a resolution corresponding to the image display unit 53, color conversion and noise reduction in relation to the digital signal of the input image.

The drive process unit 72 performs format conversion to match the interface type of the image display unit 53 of FIG. 5 in relation to the image supplied from the image conversion unit 71. The drive process unit 72 controls the image display unit 53 and causes the image display unit 53 to display the image after frame rate conversion.

Configuration Example of Image Conversion Unit

Figure 7:
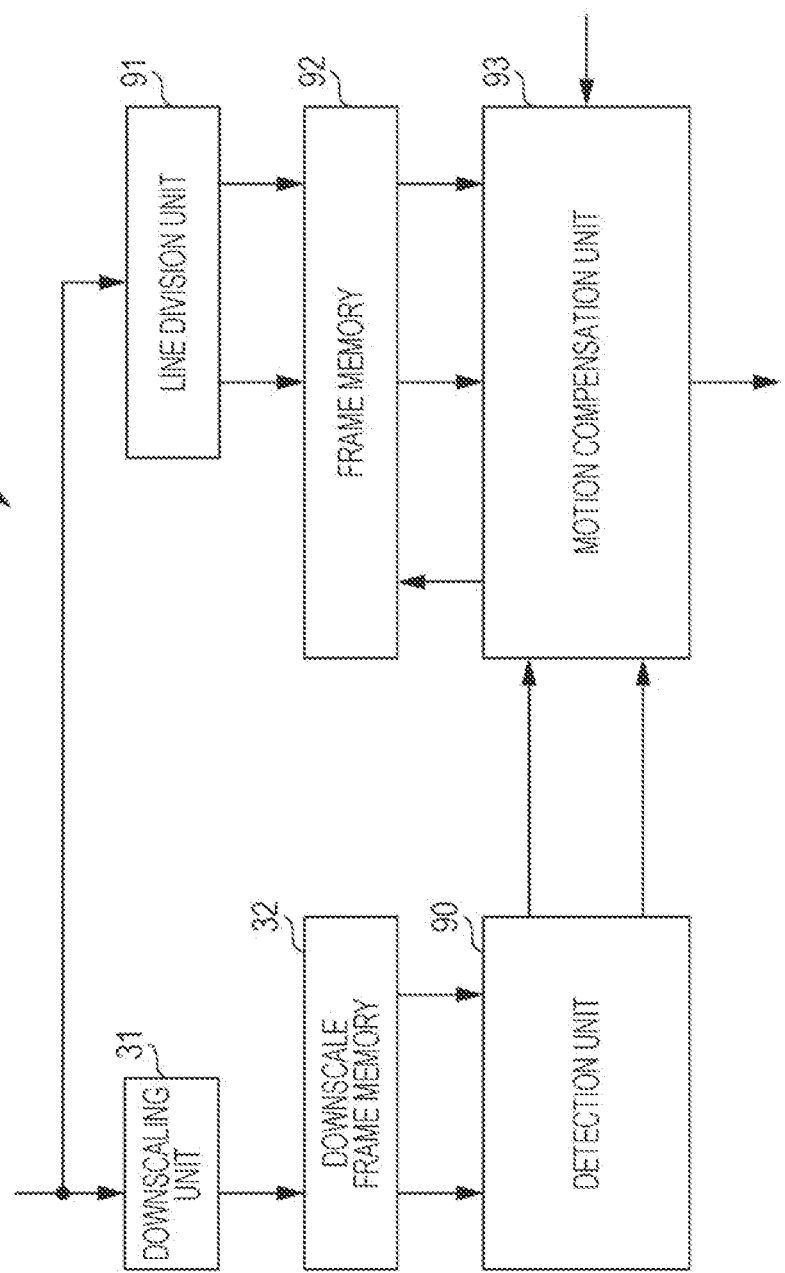
FIG. 7 is a block diagram showing a configuration example of an image conversion unit of FIG. 6.

FIG. 7 is a block diagram showing a configuration example of the image conversion unit 71 of FIG. 6.

Of the components shown in FIG. 7, components which are the same as those in FIG. 4 are given the same reference numerals. Redundant description will be omitted as appropriate.

The configuration of the image conversion unit 71 of FIG. 7 differs from the configuration of the image processing device 30 of FIG. 4 in that a detection unit 90 is provided instead of the detection unit 33, in that a line division unit 91 is newly provided, and in that a frame memory 92 is provided instead of the frame memory 11 and a motion compensation unit 93 is provided instead of the motion compensation unit 13. The image conversion unit 71 reads out the input image of a predetermined correction range within the motion compensation range on the basis of the maximum motion amount in the vertical direction of the input image from the frame memory 92 and maintains the input image of the predetermined correction range.

Specifically, in the same manner as the detection unit 33 of FIG. 4, the detection unit 90 of the image conversion unit 71 reads out the luminance signals of the processing-target pixels of the basis frame from the downscale frame memory 32 in horizontal line units in raster scan order and maintains the luminance signals in a buffer built into the detection unit 90. In addition, in the same manner as the detection unit 33, the detection unit 90 reads out the luminance signals of the search range of the processing-target pixels within the downscaled image of the reference frame from the downscale frame memory 32 in horizontal line units in raster scan order and maintains the luminance signals in a buffer built into the detection unit 90.

In the same manner as the detection unit 33, the detection unit 90 performs block matching or the like using the luminance signals of the basis frame and the reference frame which are maintained, and detects the motion vector for each pixel.

Furthermore, in the present embodiment, the motion vector is detected for each pixel. However, the detection unit of the motion vector is not limited to pixels, and may also, for example, be a block formed from a plurality of pixels.

In addition, the detection unit 90 obtains the maximum motion amount in the upward direction and the maximum motion amount in the downward direction of the input image on the basis of the motion amount in the vertical direction of the motion vectors of all of the pixels in the input image.

Furthermore, hereinafter, when there is no particular necessity to distinguish the maximum motion amount in the upward direction and the maximum motion amount in the downward direction of the input image, they are referred to together as the vertical maximum motion amount. The detection unit 90 supplies the vertical maximum motion amount and the motion vector of each of the pixels of the input image to the motion compensation unit 93.

The line division unit 91 separates the odd lines and the even lines of the input image and supplies them to the frame memory 92.

The frame memory 92 separately stores the odd lines and the even lines of the input image which are supplied from the line division unit 91. When the odd line range is supplied to the frame memory 92 from the motion compensation unit 93, the frame memory 92 reads out the odd lines of the range in horizontal line units in order from the top and supplies the lines which are read out to the motion compensation unit 93. In addition, when the even line range is supplied to the frame memory 92 from the motion compensation unit 93, the frame memory 92 reads out the even lines of the range in horizontal line units in order from the top and supplies the lines which were read out to the motion compensation unit 93.

The motion compensation unit 93 uses each pixel of the image generated after frame rate conversion as the processing-target pixel, in raster scan order. The motion compensation unit 93 determines the motion amount range which corresponds to the correction range on the basis of the interpolation phase which is input from outside and the vertical maximum motion amount which is supplied from the detection unit 90. In addition, the motion compensation unit 93 determines the odd line range and the even line range which are read out from the frame memory 92 within the correction range for each processing-target pixel on the basis of the interpolation phase and the vertical maximum motion amount.

Furthermore, the motion compensation unit 93 determines the start timings of the reading out of the odd lines and the even lines on the basis of the odd line range and the even line range. The motion compensation unit 93 supplies the odd line range to the frame memory 92 at the start timing of the reading out of the odd lines, and supplies the even line range to the frame memory 92 at the start timing of the reading out of the even lines.

The motion compensation unit 93 maintains the odd lines of the odd line range and the even lines of the even line range, which are read out from the frame memory 92 as described above, as the reference image in the buffer built into the motion compensation unit 93.

In addition, the motion compensation unit 93 obtains the motion vectors of the processing-target pixels on the basis of the motion vectors which are supplied from the detection unit 90 and the interpolation phase which is input from outside. The motion compensation unit 93 performs motion compensation for each processing-target pixel using the motion vector and the reference image maintained in the buffer built into the motion compensation unit 93, and generates the image after motion compensation as the image after frame rate conversion. Furthermore, the motion compensation unit 93 outputs the image after frame rate conversion.

Furthermore, the image conversion unit 71 of FIG. 7 includes the line division unit 91. However, when the start timings of the reading out of the odd lines and the even lines can be set individually without the frame memory 92 storing the odd lines and the even lines separately, the image conversion unit 71 may also not include the line division unit 91.

Configuration Example of Detection Unit

Figure 8:
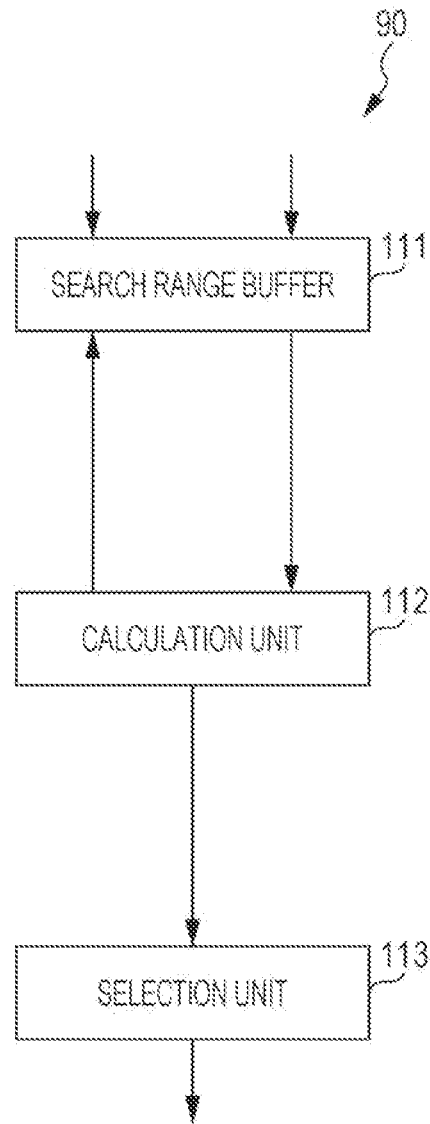
FIG. 8 is a block diagram showing a configuration example of a detection unit of FIG. 7.

FIG. 8 is a block diagram showing a configuration example of the detection unit 90 of FIG. 7.

The detection unit 90 of FIG. 8 is configured to include a search range buffer 111, a calculation unit 112 and a selection unit 113.

The search range buffer 111 of the detection unit 90 reads out the luminance signals of the processing-target pixels of the basis frame from the downscale frame memory 32 of FIG. 7 in horizontal line units in raster scan order and maintains the luminance signals. In addition, the search range buffer 111 reads out the luminance signals of the search range of the processing-target pixel within the downscaled image of the reference frame from the downscale frame memory 32 in horizontal line units in raster scan order and maintains the luminance signal.

In addition, the search range buffer 111 reads out the luminance signal, which is stored in a position on the basis of the position specified by the readout position information which is supplied from the calculation unit 112, and supplies the luminance signal to the calculation unit 112.

The calculation unit 112 supplies the information, which specifies the position of the luminance signal of the processing-target pixel of the basis frame within the search range buffer 111, to the search range buffer 111 as the readout position information. In addition, the calculation unit 112 supplies the information, which specifies the position of the luminance signal of each pixel of the search range within the search range buffer 111, to the search range buffer 111 as the readout position information.

The calculation unit 112 calculates the SADs (the Sum of Absolute Difference) between the luminance signals of each of the pixels of the search range and the luminance signals of the processing-target pixels which are supplied from the search range buffer 111, and supplies the SADs to the selection unit 113.

The selection unit 113 selects the minimum SAD from within the SADs which are supplied from the calculation unit 112. Furthermore, the selection unit 113 generates the motion vector with the pixel of the search range which corresponds to the SAD as the end point and the processing-target pixel as the start point. In addition, the selection unit 113 maintains and supplies the motion vector to the motion compensation unit 93 of FIG. 7. In addition, the selection unit 113 obtains the vertical maximum motion amount from the motion vectors of all of the pixels within the screen of the input image which is maintained, and supplies the vertical maximum motion amount to the motion compensation unit 93.

Here, the detection unit 90 detects the motion vector using block matching, however, the motion vector detection method is not limited to the block matching method.

Example of Image Stored in Search Range Buffer

Figure 9:
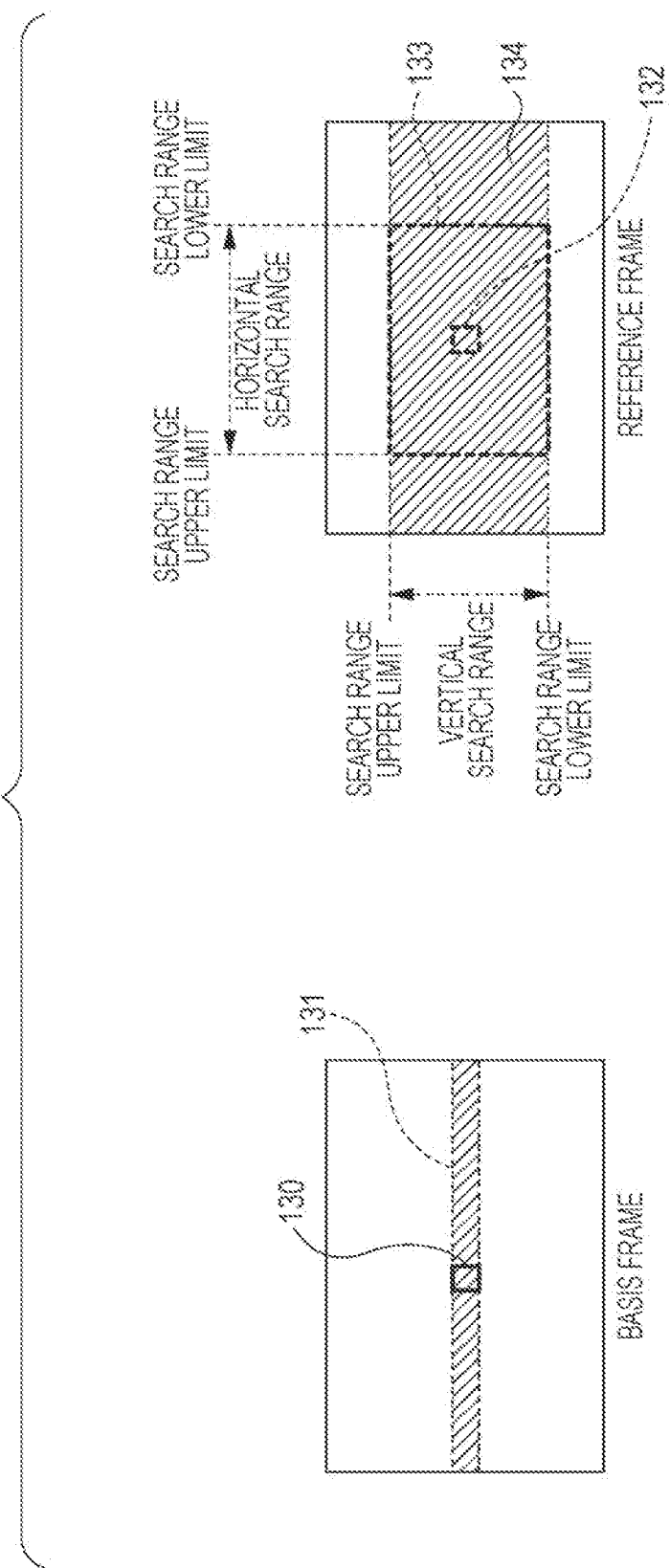
FIG. 9 is a view showing an example of an image stored in a search range buffer of FIG. 8.

FIG. 9 is a view showing an example of the image stored in the search range buffer 111 of FIG. 8.

As shown in FIG. 9, the search range buffer 111 reads out the luminance signals of a processing-target pixels 130 of the basis frame in horizontal line units and maintains the luminance signals. Therefore, the luminance signals of a range 131 formed from all of the pixels of the horizontal line including the pixel 130 are maintained in the search range buffer 111.

In addition, the search range buffer 111 reads out the luminance signals of a search range 133 of the pixel 130, where the search range 133 includes a pixel 132 of the reference frame which corresponds to the pixel 130, in horizontal line units, and maintains the luminance signals. Therefore, the luminance signals of a range 134, which is formed from all of the pixels of each of the horizontal lines within the search range 133, are stored in the search range buffer 111.

Accordingly, the data amount of the image stored within the search range buffer 111 is determined by the number of pixels in the vertical direction of the search range 133, the resolution of the processing-target image and the dynamic range of the luminance signals.

Since the image processing device 50 uses the downscaled image, not the input image, as the processing-target image, the data amount of the image which is stored in the search range buffer 111 is reduced, and it is possible to reduce the storage capacity of the search range buffer 111. Furthermore, it is generally possible to maintain the detection precision of the motion vector, even if the resolution and the dynamic range of the processing-target image are reduced to some extent.

Configuration Example of Motion Compensation Unit

Figure 10:
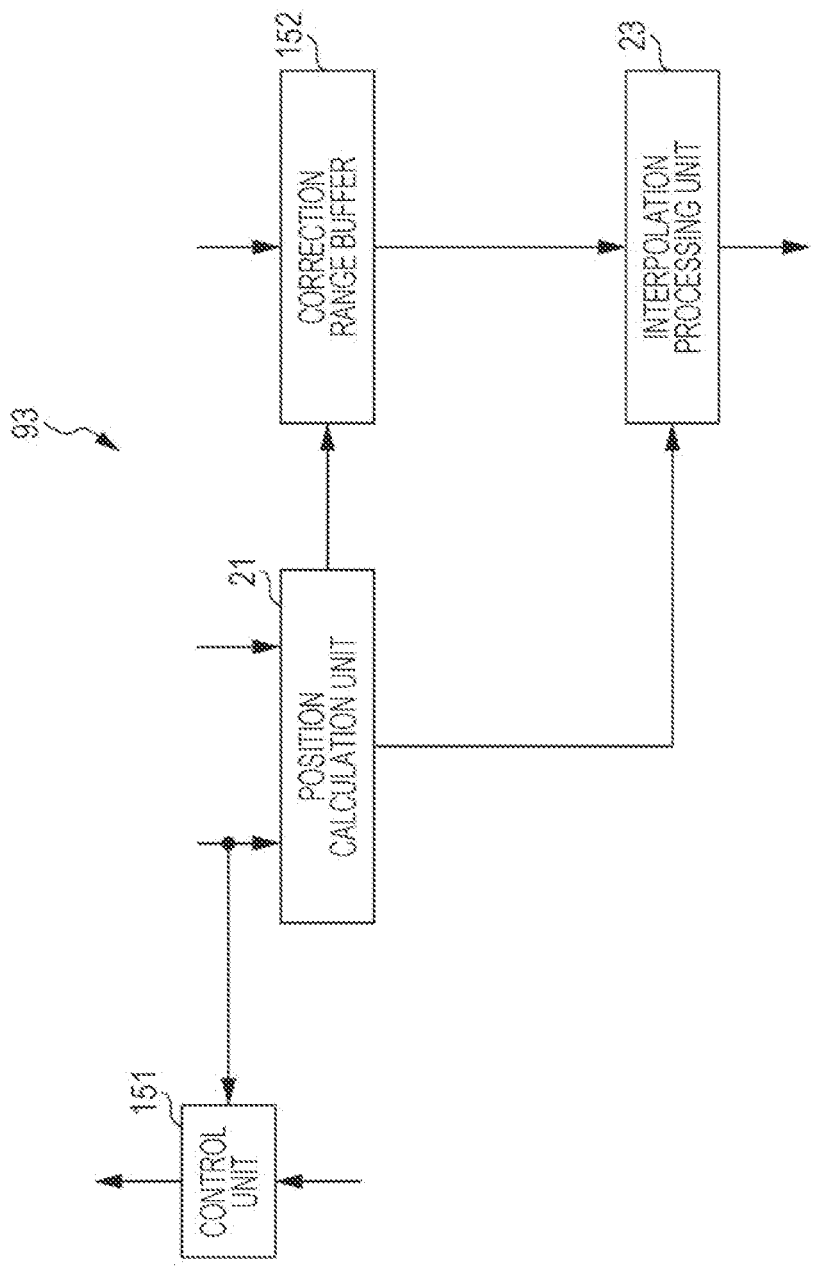
FIG. 10 is a block diagram showing a configuration example of the motion compensation unit of FIG. 7.

FIG. 10 is a block diagram showing a configuration example of the motion compensation unit 93 of FIG. 7.

Of the components shown in FIG. 10, components which are the same as those in FIG. 2 are given the same reference numerals. Redundant description will be omitted as appropriate.

The configuration of the motion compensation unit 93 of FIG. 10 differs from the configuration of the motion compensation unit 13 of FIG. 2 in that a control unit 151 is newly provided, and in that a correction range buffer 152 is provided instead of the motion compensation range buffer 22.

The control unit 151 of the motion compensation unit 93 obtains the maximum motion amounts of the upward direction and the downward direction of the motion vectors in relation to the image after frame rate conversion which correspond to the vertical maximum motion amount, on the basis of the vertical maximum motion amount which is supplied from the selection unit 113 of FIG. 8 and the interpolation phase which is input from outside. Furthermore, the control unit 151 determines the range of the input image, which corresponds to the obtained range from the maximum motion amount in the downward direction to the maximum motion amount in the upward direction, to be the correction range.

The control unit 151 classifies the motion amount range which corresponds to the correction range as an odd range, an even range or an odd and even range on the basis of the vertical maximum motion amount, the storage capacity of the correction range buffer 152 and the interpolation phase. The term "odd range" refers to a motion amount range in the vertical direction in which the motion compensation processing is performed using only the odd lines, and the term "even range" refers to a motion amount range in the vertical direction in which the motion compensation processing is performed using only the even lines. In addition, the term "odd and even range" refers to a motion amount range in the vertical direction in which the motion compensation processing is performed using both the odd lines and the even lines.

Hereinafter, description will be given of the calculation methods of the odd range, the even range and the odd and even range.

First, a capacity D of the reference image which is stored in the correction range buffer 152 is represented by the following Equation (2).

$$D = A \cdot B \cdot (2 \cdot L + 1) \quad (2)$$

Furthermore, in Equation (2), A represents the data amount (in bits) of the luminance signal and the color difference signal for each pixel, and B represents the number of pixels for each horizontal line. In addition, L represents the maximum value of the absolute value of the coordinate of the horizontal line unit in the vertical direction of the correction range, when the coordinate of the horizontal line unit in the vertical direction of the horizontal line, which includes the pixel of the basis frame which corresponds to the processing-target pixel, is set to 0. In other words, the range of the coordinates of the horizontal line unit in the vertical direction of the correction range is from −L to L.

When the capacity D is the maximum value of the storage capacity of the correction range buffer 152 or less, 2L+1 is the maximum number X of the horizontal lines which can be stored in the correction range buffer 152.

The control unit 151 classifies the motion amount range which corresponds to the correction range as an odd range R0, an odd and even range R2, or an even range R1 according to the following Expression (3), using the maximum number X of horizontal lines.

$$\left(X - \left(\frac{M+N}{2} + 1\right)\right) < R0 \le M - \left(X\left(\frac{M+N}{2} + 1\right)\right) \le$$
$$R2 \le \left(X - \left(\frac{M+N}{2} + 1\right)\right) - N \le R1 < -\left(X - \left(\frac{M+N}{2} + 1\right)\right)$$

Where $M = MvY\_up\_max \cdot \alpha$ and $N = MvY\_down\_max \cdot \alpha$ (3)

Furthermore, in Expression (3), M is the maximum motion amount in the upward direction of the motion vector in relation to the image after frame rate conversion which corresponds to the vertical maximum motion amount, and N is the maximum motion amount in the downward direction. Therefore, the range from the motion amount −N to the motion amount M is the motion amount range which corresponds to the correction range.

In addition, in Expression (3), of the vertical maximum motion amount, MvY_up_max represents the maximum motion amount in the upward direction of the input image, and MvY_down_max represents the maximum motion amount in the downward direction of the input image. In addition, α represents the interpolation phase.

According to Expression (3), the motion amount in the vertical direction of a predetermined range from the vertical maximum motion amount of the motion amount range which corresponds to the correction range is classified as the odd range R0 or the even range R1. In addition, according to the maximum number X of the horizontal lines, the motion amount range which corresponds to the correction range is entirely classified as the odd and even range R2, or is classified as at least one of the odd and even range R2, the odd range R0 and the even range R1.

Furthermore, here, from the maximum motion amount in the upward direction, the motion amount in the vertical direction of the predetermined range is set to the odd range R0, and from the maximum motion amount in the downward direction, the motion amount in the vertical direction of the predetermined range is set to the even range R1. However, from the maximum motion amount in the downward direction, the motion amount in the vertical direction of the predetermined range may be set to the odd range R0, and from the maximum motion amount in the upward direction, the motion amount in the vertical direction of the predetermined range may be set to the even range R1.

The control unit 151 determines the odd line range and the even line range which are read out from the frame memory 92 for each processing-target pixel, which is determined by the position calculation unit 21, on the basis of the odd range R0, the odd and even range R2 and the even range R1. Furthermore, the control unit 151 determines the start timing of the reading out of the odd lines and the even lines on the basis of the odd line range and the even line range.

The control unit 151 controls the reading out of the odd lines by supplying the odd line range to the frame memory 92 at the start timing of the reading out of the odd lines. In addition, the control unit 151 controls the reading out of the even lines by supplying the even line range to the frame memory 92 at the start timing of the reading out of the even lines.

The correction range buffer 152 maintains the odd lines of the odd line range and the even lines of the even line range, which are read out from the frame memory 92, as the reference image. The correction range buffer 152 reads out the luminance signal and the color difference signal of a predetermined pixel within the reference image which is maintained on the basis of the integer precision position in pixel units which is supplied from the position calculation unit 21, and supplies the signals to the interpolation processing unit 23.

Therefore, the position calculation unit 21, the correction range buffer 152 and the interpolation processing unit 23 perform the motion compensation processing using the motion vector of the processing-target pixel and the reference image. In other words, the position calculation unit 21, the correction range buffer 152 and the interpolation processing unit 23 function as the motion compensation processing unit.
Example of Reference Image FIGS. 11 and 12 are views showing examples of reference images.

Figure 11:
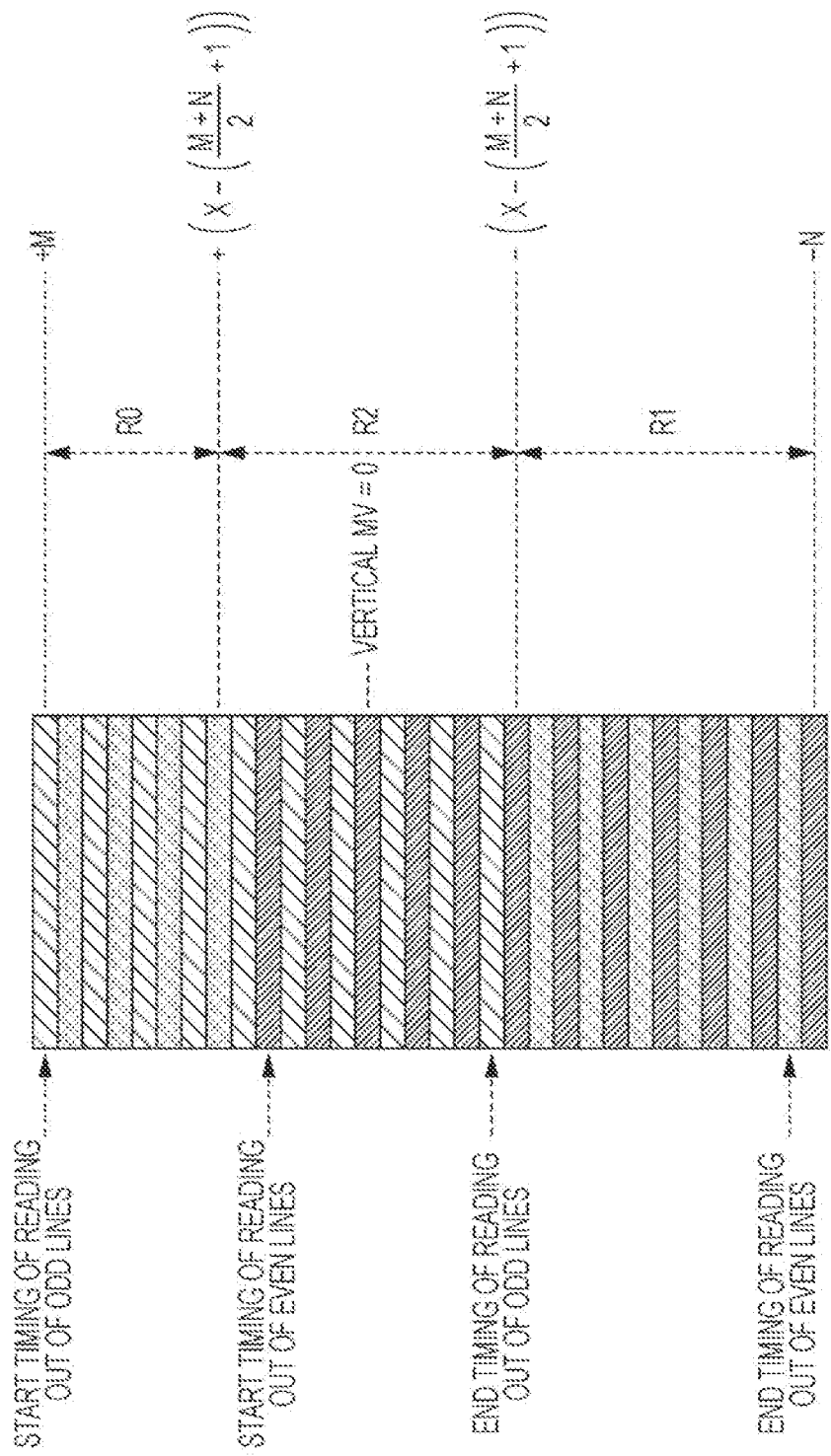
FIG. 11 is a view showing an example of a reference image.
Figure 12:
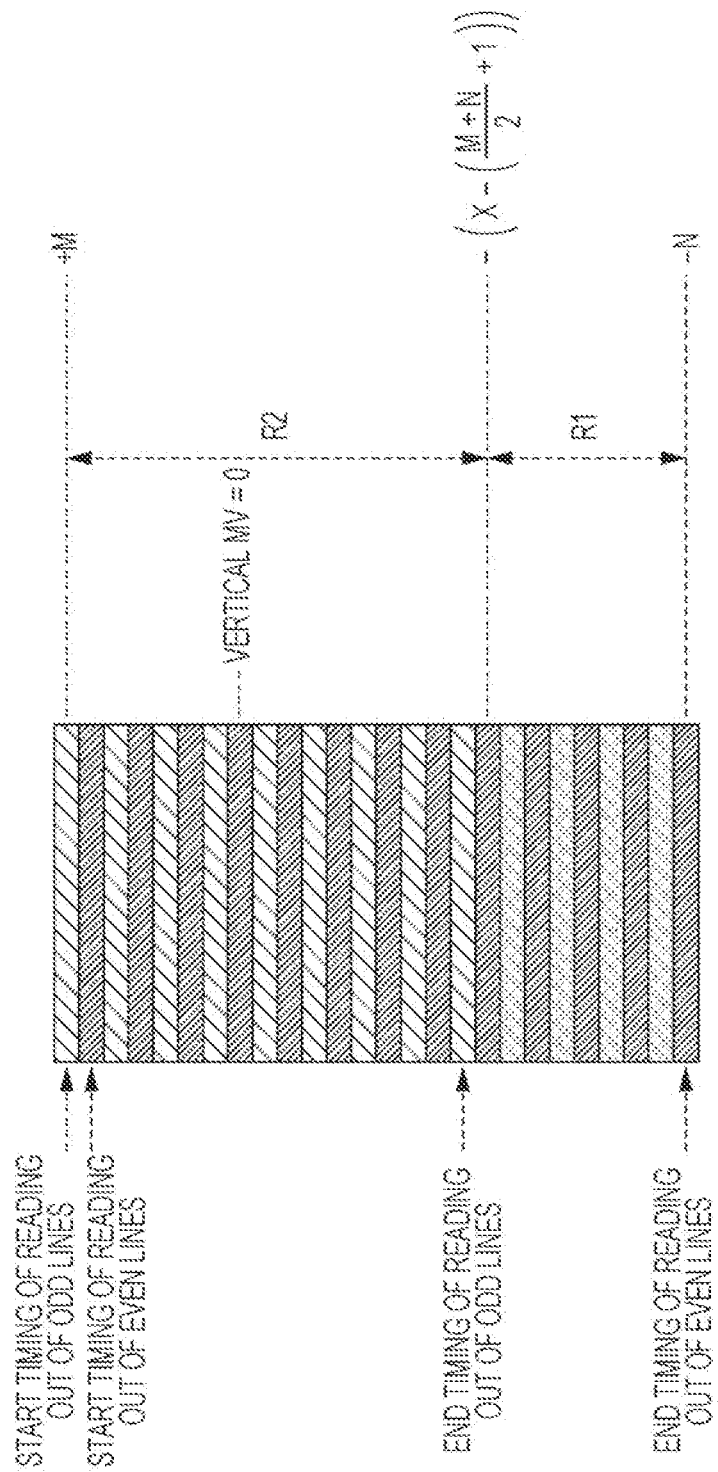
FIG. 12 is a view showing an example of a reference image.

In FIGS. 11 and 12, the rectangles which are shaded with diagonal lines which incline downward toward the left represent the image of the odd lines which is stored in the correction range buffer 152 as the reference image, and the rectangles which are shaded with diagonal lines which incline downward toward the right represent the image of the even lines which is stored as the reference image. In addition, the rectangles which are densely shaded represent the image of the horizontal lines which are not stored in the correction range buffer 152.

Therefore, as shown in FIG. 11, when both the motion amount N and the motion amount M are comparatively large, the motion amount range which corresponds to the correction range is classified as one of the odd range R0, the even range R1 and the odd and even range R2. Furthermore, the range of the input image which corresponds to the odd range R0 and the odd and even range R2 is treated as the range of the odd lines, and the range of the input image which corresponds to the odd and even range R2 and the even range R1 is treated as the range of the even lines.

Therefore, the readout timing of the first odd line within the odd line range, as the reference image, is determined to be the start timing of the reading out of the odd lines. Specifically, in the example of FIG. 11, the readout timing of the first odd line of the reference image is determined to be the start timing of the reading out of the odd lines.

In addition, the readout timing of the first even line within the even line range, as the reference image, is determined to be the start timing of the reading out of the even lines. Specifically, in the example of FIG. 11, the readout timing of the fifth even line from the top of the reference image is determined to be the start timing of the reading out of the even lines. In other words, the start timings of the reading out of the odd lines and the even lines differ.

In addition, since the readout timing of the last odd line within the odd line range, as the reference image, and the readout timing of the last even line within the even line range, as the reference image, are different, the end timings of the reading out of the odd lines and the even lines differ.

According to the above, the luminance signals and the color difference signals of the odd lines within the range of the input image which correspond to the odd range R0 are read out from the frame memory 92 as the region of the upper portion of the reference image. Furthermore, the luminance signals and the color difference signals of the odd lines and the even lines within the range of the input image which correspond to the odd and even range R2 are read out from the frame memory 92 as the region of the middle portion of the reference image. Furthermore, the luminance signals and the color difference signals of the even lines within the range of the input image which correspond to the even range R1 are read out from the frame memory 92 as the region of the lower portion of the reference image.

Meanwhile, as shown in FIG. 12, when the motion amount M is comparatively small and there is a leeway in the storage capacity of the correction range buffer 152, the motion amount in the vertical direction of a predetermined range from a motion amount M within the motion amount range which corresponds to the correction range is classified, not as the odd range R0, but as the odd and even range R2. Therefore, the motion amount range which corresponds to the correction range is classified to be one of the even range R1 and the odd and even range R2. In addition, the even range R1 of FIG. 12 is small in comparison to the even range R1 of FIG. 11, and the odd and even range R2 of FIG. 12 is large in comparison to the odd and even range R2 of FIG. 11.

In this case, the range of the input image which corresponds to the odd and even range R2 is treated as the odd line range, and the range of the input image which corresponds to the odd and even range R2 and the even range R1 is treated as the even line range. Furthermore, on the basis of the odd line range, the readout timing of the first odd line within the odd line range, as the reference image, is determined to be the start timing of the reading out of the odd lines. Specifically, in the example of FIG. 12, the readout timing of the first odd line of the reference image is determined to be the start timing of the reading out of the odd lines.

In addition, on the basis of the even line range, the readout timing of the first even line within the even line range, as the reference image, is determined to be the start timing of the reading out of the even lines. Specifically, in the example of FIG. 12, the readout timing of the first even line of the reference image is determined to be the start timing of the reading out of the even lines. In other words, the start timings of the reading out of the odd lines and the even lines are the same.

Furthermore, since the readout timing of the last odd line within the odd line range, as the reference image, and the readout timing of the last even line within the even line range, as the reference image, are different, the end timings of the reading out of the odd lines and the even lines differ.

According to the above, the luminance signals and the color difference signals of the odd lines and the even lines within the range of the input image which correspond to the odd and even range R2 are read out from the frame memory 92 as the region of the upper portion of the reference image. Furthermore, the luminance signals and the color difference signals of the even lines within the range of the input image which correspond to the even range R1 are read out from the frame memory 92 as the region of the lower portion of the reference image.

Furthermore, while omitted from the drawings, in the same manner as a case in which a motion amount N is comparatively small and there is a leeway in the storage capacity of the correction range buffer 152, the motion amount in the vertical direction of a predetermined range from the motion amount N within the motion amount range which corresponds to the correction range is classified, not as the even range R1, but as the odd and even range R2. In addition, when both the motion amount M and the motion amount N are comparatively small and there is a leeway in the storage capacity of the correction range buffer 152, the motion amount range which corresponds to the correction range is classified entirely as the odd and even range R2.

As described above, the motion amount range which corresponds to the correction range is classified as the odd range R0, the even range R1 or the odd and even range R2. Therefore, not the motion compensation range which corresponds to the possible motion vectors, but the input image of the correction range is read out as the reference image. Therefore, the correction range buffer 152 does not have to maintain, as the reference image, an input image of a range which corresponds to the motion amount other than the motion amount from −N to M, which is not present in the processing-target image, that is, an input image which is not used in the motion compensation.

As a result, it is possible to reduce the data amount of the reference image which is maintained in the correction range buffer 152. At this time, since the input image which is an input image within the motion compensation range and is not maintained as the reference image is an input image which is not used in the motion compensation, degradation of the image quality of the image after motion compensation does not occur.

In addition, in the odd and even range R2, since motion compensation is performed using both the odd lines and the even lines of the input image, that is, motion compensation is performed at the resolution of the input image, image quality degradation of the image after motion compensation does not occur. In contrast, in the odd range R0 and the even range R1, since motion compensation is performed using one of the odd lines and the even lines of the input image, that is, motion compensation is performed at a resolution in the vertical direction which is ½ the resolution of the input image, image quality degradation of the image after motion compensation occurs.

However, as in the case of FIG. 11, an image in which both the motion amount −N and the motion amount M are comparatively large, that is, an image which has both high speed motion in the upward direction and in the downward direction within the screen, is rare and in most images, at least one of the motion amount −N and the motion amount M is small. Therefore, there is a high likelihood that at least one of the odd range R0 and the even range R1 is not present or is decreased, and that the odd and even range R2 is increased. Accordingly, there is a low likelihood that image degradation occurs in the image after motion compensation.

Description of Effects

FIG. 13 is a diagram illustrating the effects of the image conversion unit 71.

As shown in FIG. 13, the image conversion unit 71 dynamically switches the start timing or the end timing of the odd lines and the even lines on the basis of the range from the motion amount −N to the motion amount M (hereinafter referred to as the vertical maximum motion amount range).

Specifically, when the vertical maximum motion amount range is large and the input image of the correction range may not be stored in the correction range buffer 152, as shown in FIGS. 11 and 12, the image conversion unit 71 shifts the start timing and the end timing of the reading out of the odd lines and the even lines.

Accordingly, the resolution in the vertical direction of a portion of the reference image which is stored in the correction range buffer 152 is half that of the input image. In other words, the image conversion unit 71 can easily generate a ½ vertical downscaled image, in which the resolution in the vertical direction of the input image is halved, and cause the correction range buffer 152 to store the ½ vertical downscaled image as the reference image by shifting the start timing or the end timing of the reading out of the odd lines and the even lines.

Meanwhile, when the vertical maximum motion amount range is small and the input image of the correction range can be stored in the correction range buffer 152, the image conversion unit 71 does not shift the start timing and the end timing of the reading out of the odd lines and the even lines. Therefore, the input image of the correction range is stored as-is in the correction range buffer 152 as the reference image.

In addition, as shown in FIG. 13, the image conversion unit 71 dynamically switches the configuration of the correction range buffer 152 on the basis of the vertical maximum motion amount range.

Specifically, when the vertical maximum motion amount range is large and the input image of the correction range may not be stored in the correction range buffer 152, as shown in FIGS. 11 and 12, the image conversion unit 71 classifies the motion amount which corresponds to the correction range to be at least one of the odd range R0 and the even range R1, and the odd and even range R2, according to the magnitude of the motion amount M and the motion amount N. Therefore, compared to a case in which the odd range R0 and the even range R1 are determined, the region of the ½ vertical downscaled image within the reference image can be suppressed.

In contrast, when the vertical maximum motion amount range is small and the input image of the correction range can be stored in the correction range buffer 152, the image conversion unit 71 classifies all of the motion amount which corresponds to the correction range as the odd and even range R2.

In addition, as shown in FIG. 13, in the image conversion unit 71, the image used in the motion compensation processing is dynamically switched between the ½ vertical downscaled image or the input image on the basis of the vertical maximum motion amount range and the motion amount in the vertical direction of the processing-target pixel.

Specifically, when the vertical maximum motion amount range is large and the motion amount in the vertical direction of the processing-target pixel is large, in the motion compensation processing, the ½ vertical downscaled image, which corresponds to the odd range R0 or the even range R1 within the correction range buffer 152, is used as the reference image. Therefore, image quality degradation occurs in the image after motion compensation processing.

Meanwhile, in a case other than when the vertical maximum motion amount range is large and the motion amount in the vertical direction of the processing-target pixel is large, in the motion compensation processing, the input image, which corresponds to the odd and even range R2 within the correction range buffer 152, is used as the reference image. Therefore, image quality degradation does not occur in the image after motion compensation processing.

In this manner, in a case other than when the vertical maximum motion amount range is large and the motion amount in the vertical direction of the processing-target pixel is large, in the image conversion unit 71, the resolution of the reference image is not reduced and the image quality of the image after motion compensation is not degraded. In other words, there is a low likelihood that the image quality of the image after motion compensation processing is degraded. Furthermore, even when image quality degradation occurs, since the motion amount in the vertical direction of the processing-target pixel is large, the image quality degradation is difficult to perceive.

In contrast, when the motion amount range, on which motion compensation is performed using the downscaled image, is fixed, image quality degradation typically occurs in the pixels of the motion amount of the range.

Processing of Image Conversion Unit

Figure 14A:
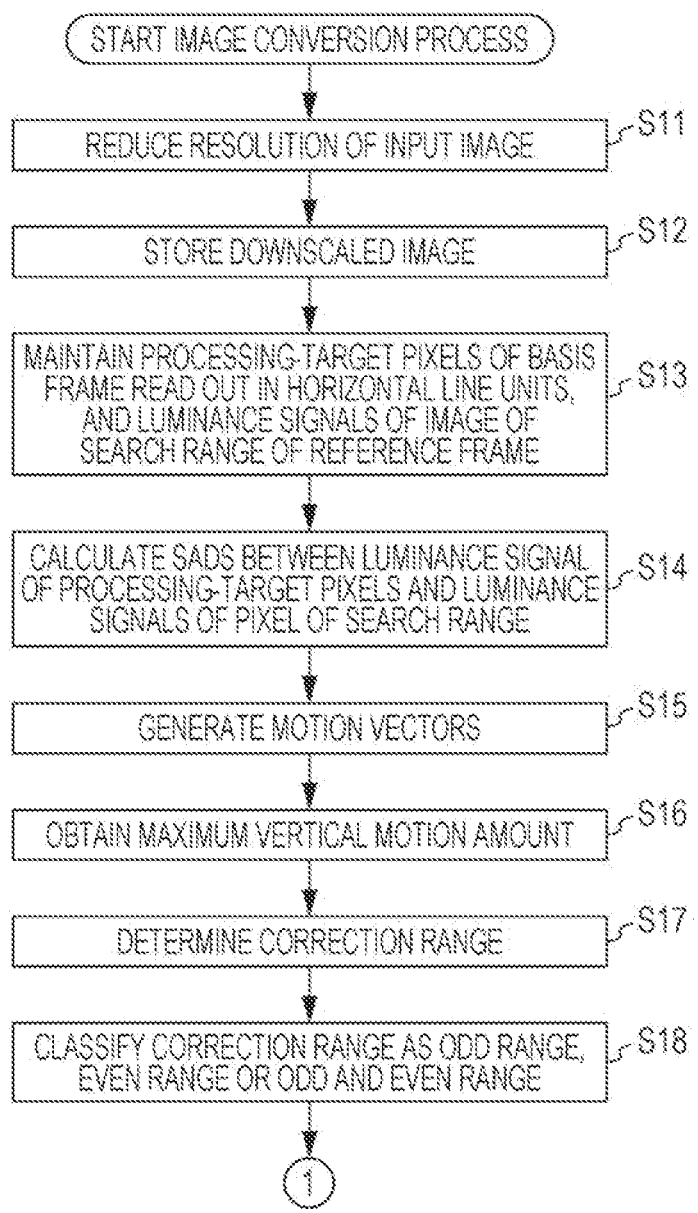
FIGS. 14A and 14B are flowcharts illustrating an image conversion process of the image conversion unit of FIG. 7.
Figure 14B:
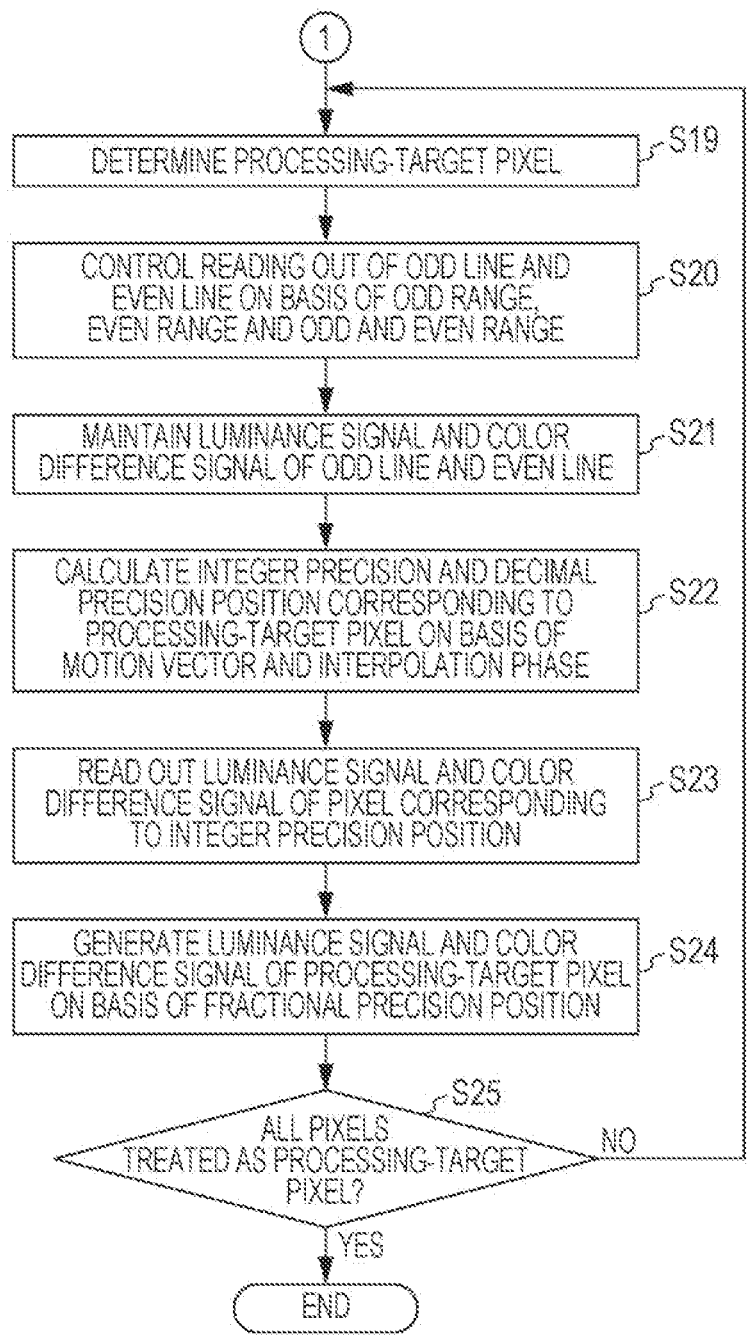

FIGS. 14A and 14B are flowcharts illustrating the image conversion process of the image conversion unit 71 of FIG. 7.

In step S11 of FIG. 14A, the downscaling unit 31 of the image conversion unit 71 reduces the resolution of the input image, generates the downscaled image in frame units and supplies the downscaled image to the downscale frame memory 32. In step S12, the downscale frame memory 32 stores the downscaled image of frame units supplied from the downscaling unit 31. The following processes of steps S13 to S15 are performed for each processing-target pixel, with each pixel of the downscaled image of the basis frame being treated as the processing-target pixel.

In step S13, the search range buffer 111 (FIG. 8) of the detection unit 90 reads out the luminance signals of the downscaled image of the search range of the processing-target pixel of the basis frame and the processing-target pixels of the reference frame from the downscale frame memory 32 of FIG. 7 in horizontal line units in raster scan order and maintains the luminance signals.

In step S14, the calculation unit 112 supplies the readout position information to the search range buffer 111 and calculates the SADs between the luminance signals of each of the pixels of the search range and the luminance signals of the processing-target pixels which are read out from the search range buffer 111. The calculation unit 112 supplies the calculated SADs to the selection unit 113.

In step S15, the selection unit 113 selects the minimum SAD from within the SADs which are supplied from the calculation unit 112, and generates the motion vector with the pixel of the search range which corresponds to the SAD as the end point and the processing-target pixel as the start point. The selection unit 113 maintains the motion vector and supplies the motion vector to the motion compensation unit 93 of FIG. 7.

In step S16, the selection unit 113 obtains the vertical maximum motion amount from the motion vectors of all of the pixels within the screen of the input image which is maintained, and supplies the vertical maximum motion amount to the motion compensation unit 93.

In step S17, the control unit 151 (FIG. 10) of the motion compensation unit 93 determines the correction range on the basis of the vertical maximum motion amount which is supplied from the selection unit 113 of FIG. 8 and the interpolation phase which is input from outside.

In step S18, the control unit 151 classifies the motion amount range which corresponds to the correction range as an odd range, an even range or an odd and even range on the basis of the vertical maximum motion amount, the capacity of the correction range buffer 152 and the interpolation phase which is input from outside.

In step S19, the position calculation unit 21 determines the pixel of the image after frame rate conversion, which is not yet determined to be the processing-target pixel, to be the processing-target pixel.

In step S20, the control unit 151 controls the reading out of the odd lines and the even lines on the basis of the odd range R0, the odd and even range R2 and the even range R1.

Specifically, the control unit 151 determines the odd line range and the even line range to be read out in relation to the processing-target pixel and determines the start timing of the reading out of the odd lines and the even lines on the basis of the odd range R0, the odd and even range R2 and the even range R1. Furthermore, the control unit 151 supplies the odd line range to the frame memory 92 at the start timing of the reading out of the odd lines, and supplies the even line range to the frame memory 92 at the start timing of the reading out of the even lines.

In step S21, the correction range buffer 152 maintains the luminance signals and the color difference signals of the odd lines and the even lines of the input image, which are read out from the frame memory 92 in horizontal line units in raster scan order according to the control of step S20, as the reference image.

In step S22, the position calculation unit 21 calculates the integer precision positions and the decimal precision positions in pixel units of the input image which correspond to the processing-target pixels on the basis of the motion vectors supplied from the detection unit 90 of FIG. 7 and the interpolation phase which is input from outside. The position calculation unit 21 supplies the calculated integer precision positions in pixel units to the correction range buffer 152 and supplies the decimal precision positions in pixel units to the interpolation processing unit 23.

In step S23, the correction range buffer 152 reads out the luminance signals and the color difference signals of the pixels which correspond to the integer precision positions in pixel units which are supplied from the position calculation unit 21 from the maintained reference image and supplies the signals to the interpolation processing unit 23.

In step S24, the interpolation processing unit 23 performs linear interpolation or the like on the luminance signals and the color difference signals which are supplied from the correction range buffer 152 on the basis of the decimal precision positions in pixel units supplied from the position calculation unit 21. In addition, the interpolation processing unit 23 generates the luminance signal and the color difference signal of the processing-target pixel.

In step S25, the position calculation unit 21 judges whether or not all of the pixels of the image after frame rate conversion have been treated as the processing-target pixel. In step S25, when the position calculation unit 21 judges that not all of the pixels of the image after frame rate conversion have been treated as the processing-target pixel yet, the process returns to step S19 and the following processes are repeated.

Meanwhile, in step S25, when the position calculation unit 21 judges that all of the pixels of the image after frame rate conversion have been treated as the processing-target pixel, the interpolation processing unit 23 outputs the luminance signals and the color difference signals of all of the pixels after frame rate conversion which are generated in step S24, and the process ends.

As described above, the image processing device 50 controls the reading out of the input image, as the reference image, of the correction range on the basis of the vertical maximum motion amount. Therefore, in comparison to a case in which the input image of a predetermined motion compensation range is read out as the reference image, reading out of the input image, as the reference image, which is not used in the motion compensation can be prevented, and the data amount of the reference image can be reduced. In addition, since the input image which is not read out as the reference image is an input image which is not used in the motion compensation, image quality degradation of the image after motion compensation does not occur. Accordingly, the image processing device 50 can be considered to be capable of reducing the data amount of the reference image without degrading the image quality of the image after motion compensation.

In addition, the image processing device 50 generates the ½ vertical downscaled image by controlling the reading out of the odd lines and the even lines. Therefore, there are no overheads such as performing a process of generating ½ vertical downscaled images from the input images and newly providing memory which stores the ½ vertical downscaled images.

Furthermore, since the image processing device 50 determines the motion amount in the vertical direction of a predetermined range from the vertical maximum motion amount to be the odd range R0 or the even range R1, the ½ vertical downscaled image may be used in only the motion compensation processing of the region which has high speed motion. Therefore, it is difficult to perceive image quality degradation in the image after motion compensation processing.

Furthermore, as described above, the input image of the basis frame is used as the reference image. However, the input image of the reference frame with a phase which is close to that of the basis frame on the basis of the interpolation phase may also be used as the reference image. In addition, the input images of both the basis frame and the reference frame may also be used as the reference image. Furthermore, the input image of a frame other than the basis frame and the reference frame may also be used as the reference image.

In addition, the motion compensation processing may also be performed, not for each pixel, but for each block which corresponds to the detection unit of the motion vector. In addition, in the detection process of the motion vector, the input image may be used instead of the downscaled image.

Description of Computer to which Present Disclosure is Applied

The series of processes described above may be executed using hardware and may also be executed using software. When the series of processes is executed using software, the program configuring the software is installed on a computer. Here, the computer includes a computer embedded within dedicated hardware, and an ordinary personal computer or the like which is capable of executing the various functions due to various programs being installed thereon.

FIG. 15 is a block diagram showing a configuration example of the hardware of the computer which executes the series of processes described above using a program.

In the computer, a CPU (Central Processing Unit) 201, ROM (Read Only Memory) 202, and RAM (Random Access Memory) 203 are connected to one another by a BUS 204.

Furthermore, an input-output interface 205 is connected to the bus 204. The input-output interface 205 is connected to an input unit 206, an output unit 207, a storage unit 208, a communication unit 209, and a drive 210.

The input unit 206 is formed from a keyboard, a mouse, a microphone and the like. The output unit 207 is formed from a display, a speaker, and the like. The storage unit 208 is formed from a hard disk, non-volatile memory or the like. The communication unit 209 is formed from a network interface or the like. The drive 210 drives a removable medium 211 such as a magnetic disk, an optical disc, a magneto-optical disc or semiconductor memory.

In the computer configured as described above, the series of processes described above are performed by the CPU 201, for example, loading the program stored in the storage unit 208 into the RAM 203 via the input-output interface 205 and the bus 204, and executing the loaded program.

The program executed by the computer (the CPU 201), for example, may be provided by recording the program onto the removable medium 211 as a packaged medium or the like. In addition, it is possible to provide the program via a wired or wireless transmission medium such as a local area network, the Internet, or a digital satellite broadcast.

In the computer, it is possible to install the program into the storage unit 208 via the input-output interface 205 by mounting the removable medium 211 into the drive 210. In addition, it is possible to install the program into the storage unit 208 by receiving the program using the communication unit 209 via a wired or wireless transmission medium. Additionally, it is possible to install the program beforehand on a ROM 202 or the storage unit 208.

Furthermore, the program which the computer executes may be a program in which the processes are performed in time series order in the order described in the present specification. The program may also be a program in which the processes are performed in parallel or at the necessary timing such as when the process is called.

The present disclosure is particularly applicable to an input image of a high resolution such as 4K resolution (3840×2160 pixels).

In addition, the embodiments of the present disclosure are not limited to the embodiment described above, and various modifications may be made within the scope not departing from the spirit of the present disclosure.

For example, in the present disclosure, it is possible to adopt a cloud computing configuration in which one function is distributed, shared and processed by a plurality of devices via a network.

In addition, in addition to executing each of the steps described in the flowchart described above using one device, it is possible to distribute and execute the steps over a plurality of devices.

Furthermore, in a case in which a plurality of processes are contained in one step, in addition to executing the processes on one device, it is possible to distribute and execute the plurality of processes contained in that one step on a plurality of devices.

Furthermore, the present disclosure may adopt the following configurations.

(1) An image processing device including: a control unit which controls a reading out of a reference image which is referred to when performing motion compensation on an image, with a range based on a maximum value of a motion amount in a vertical direction of a motion vector of the image as a target; and a motion compensation processing unit which performs motion compensation on the image using the motion vector and the reference image which is read out according to the control by the control unit.

(2) The image processing device according to (1), in which the control unit performs control such that a portion of the reference image is downscaled on a basis of the maximum value, and that the downscaled reference image is read out.

(3) The image processing device according to (2), in which the control unit performs control such that a portion of the reference image which corresponds to a motion amount in a vertical direction of a predetermined range from the maximum value is downscaled and read out.

(4) The image processing device according to (3), in which the motion compensation processing unit performs motion compensation on the image using a region which is downscaled or a region which is not downscaled of the reference image which corresponds to the motion vector.

(5) The image processing device according to (3) or (4), in which the predetermined range is determined on the basis of the maximum value.

(6) The image processing device according to any one of (2) to (5), in which the control unit performs control such that a portion of the reference image is downscaled and read out by reading out a portion of odd lines or even lines of the reference image.

(7) The image processing device according to (6), in which the control unit controls the reading out of the reference image such that timings of a start or an end of the reading out of the odd lines and the even lines of the reference image differ.

(8) An image processing method of an image processing device including: controlling a read out of a reference image which is referred to when performing motion compensation on an image, with a range based on a maximum value of a motion amount in a vertical direction of a motion vector of the image as a target; and performing motion compensation on the image using the motion vector and the reference image which is read out according to the controlling.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device, comprising:
   a control unit which controls a reading out of a reference image which is referred to when performing motion compensation on an image, with a range based on a maximum value of a motion amount in a vertical direction of a motion vector of the image as a target; and
   a motion compensation processing unit which performs motion compensation on the image using the motion vector and the reference image which is read out according to the control by the control unit,
   wherein the control unit performs control such that a portion of the reference image is downscaled on a basis of the maximum value, and that the downscaled reference image is read out,
   wherein the control unit performs control such that a portion of the reference image is downscaled and read out by reading out a portion of odd lines or even lines of the reference image, and
   wherein the control unit and the motion compensation processing unit are each implemented via at least one processor.

2. The image processing device according to claim 1, wherein the control unit performs control such that a portion of the reference image which corresponds to a motion amount in a vertical direction of a predetermined range from the maximum value is downscaled and read out.

3. The image processing device according to claim 2, wherein the motion compensation processing unit performs motion compensation on the image using a region which is downscaled or a region which is not downscaled of the reference image which corresponds to the motion vector.

4. The image processing device according to claim 2, wherein the predetermined range is determined on the basis of the maximum value.

5. The image processing device according to claim 1,
wherein the control unit controls the reading out of the reference image such that timings of a start or an end of the reading out of the odd lines and the even lines of the reference image differ.

6. An image processing method of an image processing device, the method comprising:
controlling a read out of a reference image which is referred to when performing motion compensation on an image, with a range based on a maximum value of a motion amount in a vertical direction of a motion vector of the image as a target; and
performing motion compensation on the image using the motion vector and the reference image which is read out according to the controlling,
wherein the read out of the reference image is controlled such that a portion of the reference image is downscaled on a basis of the maximum value, and the downscaled reference image is read out, and
wherein the read out of the reference image is controlled such that a portion of the reference image is downscaled and read out by reading out a portion of odd lines or even lines of the reference image.

7. The image processing method according to claim 6,
wherein the read out of the reference image is controlled such that a portion of the reference image which corresponds to a motion amount in a vertical direction of a predetermined range from the maximum value is downscaled and read out.

8. The image processing method according to claim 7,
wherein the motion compensation is performed on the image using a region which is downscaled or a region which is not downscaled of the reference image which corresponds to the motion vector.

9. The image processing method according to claim 7,
wherein the predetermined range is determined on the basis of the maximum value.

10. The image processing method according to claim 6,
wherein the reading out of the reference image is controlled such that timings of a start or an end of the reading out of the odd lines and the even lines of the reference image differ.

11. A non-transitory computer-readable medium having embodied thereon a program, which when executed by a computer causes the computer to execute an image processing method, the method comprising:
controlling a read out of a reference image which is referred to when performing motion compensation on an image, with a range based on a maximum value of a motion amount in a vertical direction of a motion vector of the image as a target; and
performing motion compensation on the image using the motion vector and the reference image which is read out according to the controlling,
wherein the read out of the reference image is controlled such that a portion of the reference image is downscaled on a basis of the maximum value, and the downscaled reference image is read out, and
wherein the read out of the reference image is controlled such that a portion of the reference image is downscaled and read out by reading out a portion of odd lines or even lines of the reference image.

12. The non-transitory computer-readable medium according to claim 11,
wherein the read out of the reference image is controlled such that a portion of the reference image which corresponds to a motion amount in a vertical direction of a predetermined range from the maximum value is downscaled and read out.

13. The non-transitory computer-readable medium according to claim 12,
wherein the motion compensation is performed on the image using a region which is downscaled or a region which is not downscaled of the reference image which corresponds to the motion vector.

14. The non-transitory computer-readable medium according to claim 12,
wherein the predetermined range is determined on the basis of the maximum value.

15. The non-transitory computer-readable medium according to claim 11,
wherein the reading out of the reference image is controlled such that timings of a start or an end of the reading out of the odd lines and the even lines of the reference image differ.

* * * * *